United States Patent
Devkar et al.

(10) Patent No.: US 9,871,784 B2
(45) Date of Patent: Jan. 16, 2018

(54) SYSTEM AND METHOD FOR IMAGE BASED LOCATION SPECIFIC PASSWORD CONSTRUCTION AND AUTHENTICATION

(71) Applicant: Tata Consultancy Services Limited, Mumbai, Maharashtra (IN)

(72) Inventors: Sujit Devkar, Maharashtra (IN); Pankaj Harish Doke, Maharashtra (IN); Sylvan Lobo, Maharashtra (IN); Ankith Reddy, Maharashtra (IN)

(73) Assignee: Tata Consultancy Services Limited, Mumbai (IN)

( * ) Notice: Subject to any disclaimer, the term of this patent is extended or adjusted under 35 U.S.C. 154(b) by 174 days.

(21) Appl. No.: 15/002,830

(22) Filed: Jan. 21, 2016

(65) Prior Publication Data

US 2016/0219036 A1    Jul. 28, 2016

(30) Foreign Application Priority Data

Jan. 22, 2015  (IN) ............................ 228/MUM/2015

(51) Int. Cl.
| | |
|---|---|
| *H04L 29/06* | (2006.01) |
| *G06F 21/36* | (2013.01) |
| *H04L 9/08* | (2006.01) |
| *H04L 9/32* | (2006.01) |
| *H04W 4/02* | (2009.01) |
| *H04W 12/06* | (2009.01) |
| *H04W 12/04* | (2009.01) |

(52) U.S. Cl.
CPC ............ *H04L 63/083* (2013.01); *G06F 21/36* (2013.01); *H04L 9/0872* (2013.01);
(Continued)

(58) Field of Classification Search
CPC ... H04L 63/083; H04L 9/0872; H04L 9/3226; H04L 63/20; G06F 21/36
(Continued)

(56) References Cited

U.S. PATENT DOCUMENTS

| | | |
|---|---|---|
| 8,117,458 B2 | 2/2012 | Osborn, III et al. |
| 8,347,103 B2 | 1/2013 | Jones et al. |

(Continued)

OTHER PUBLICATIONS

Saranya, "Authentication Scheme for Session Passwords using Color and Image", Sep. 1, 2017, International Journal on Smart Sensing and Intelligent Systems, pp. 590-603.*

(Continued)

*Primary Examiner* — Kenneth Chang
*Assistant Examiner* — Gregory Lane
(74) *Attorney, Agent, or Firm* — Finnegan, Henderson, Farabow, Garrett & Dunner LLP (57) ABSTRACT

A computer implemented system and method for image based location specific password construction and authentication is provided. The system helps users to recognize the password in terms of objects in an image rather than recalling the alphanumeric passwords. A graph walk generator present in the system guides a user to take unique pictures/images/photographs from user's geographical location which helps the user to recognize password easily in future. The system helps in creating and maintaining a strong password by using pseudorandom image presenter. It also allows a user to aid his photographic memory to get authenticated to the system. Every user generates certain number of images by capturing images in vicinity and select objects from an image to create a password. A user authentication module present in the system then authenticates the user based on sequence of the objects within the captured image to provide one-time image based authentication.

13 Claims, 5 Drawing Sheets

(52) U.S. Cl.
CPC ............ *H04L 9/3226* (2013.01); *H04L 63/20* (2013.01); *H04W 4/02* (2013.01); *H04W 4/021* (2013.01); *H04W 12/06* (2013.01); *H04W 12/04* (2013.01)

(58) Field of Classification Search
USPC ......................................................... 726/1, 4
See application file for complete search history.

(56) References Cited

U.S. PATENT DOCUMENTS

| | | |
|---|---|---|
| 8,392,975 B1 | 3/2013 | Raghunath |
| 2012/0005483 A1 | 1/2012 | Patvarczki et al. |
| 2013/0036461 A1 | 2/2013 | Lowry |
| 2015/0178490 A1* | 6/2015 | Tamboly .................. G06F 21/46 726/4 |

OTHER PUBLICATIONS

Dhamija, R. et al. (2000) "Déjà Vu: A User Study Using Images for Authentication," *SSYM'00 Proceedings of the 9th Conference on USENIX Security Symposium*, vol. 9, 14 pages.

Takada, T. et al. (2003). "Awase-E: Image-based Authentication for Mobile Phones using User's Favorite Images" Chapter In *Human-Computer Interaction with Mobile Devices and Services*. L. Chittaro ed., Springer Berlin Heidelberg, pp. 347-351.

Akula, S. et al. (2004). "Image Based Registration and Authentication System," *Proceedings of Midwest Instruction and Computing Symposium*, vol. 4, 5 pages.

* cited by examiner

SYSTEM AND METHOD FOR IMAGE BASED LOCATION SPECIFIC PASSWORD CONSTRUCTION AND AUTHENTICATION

PRIORITY CLAIM

This U.S. patent application claims priority under 35 U.S.C. §119 to: India Application No. 228/MUM/2015, filed on 22 Jan., 2015. The entire contents of the aforementioned application are incorporated herein by reference.

TECHNICAL FIELD

This disclosure relates generally to the field of password construction and authentication, and more particularly, relates to a system and method for image based location specific password construction and authentication.

BACKGROUND

In recent years there has been a steady increase in vast pool of computer systems and applications that process and store huge amount of sensitive information via a computer network such as Internet, in order to meet the ever increasing needs of users. Internet users create accounts and get benefits of various services offered on Internet by accessing various computer systems. In many scenarios, to provide a proof of the user's identity, users are required to provide user credentials or sensitive information, which are then stored in servers for future authentications. Usually, such sensitive information that enables user authentication is stored in text format or is encrypted with some basic encryption technique. This provides considerably easy unauthorized access to computers and servers for accessing users' confidential information which finally leads to forfeiture of monetary transactions, fraud and unethical use of a user's information.

In a conventional authentication mechanism, it is mandatory for every user to create a password or passcode containing alphanumeric and special characters having fixed minimum length to avoid unauthorized access. If a password is weak, users are requested by the system to rethink and choose a stronger password. Generally, every system uses different techniques to choose password and calculate password strength for an account. Thus, users are prompted/suggested to use alphanumeric characters along with special characters by every individual service provider. Use of several such services tends to create multiple passwords for a single user. It is difficult to remember various passwords and then associate those passwords to the respective services. Additionally, at numerous occasions users fail to recall a password due to its complexity. Besides, it is not a good practice to keep a single password for all the services. As, if one account of a service is compromised, then, all the accounts of that user might be at stake. An alternative mechanism is to protect the passwords by appending them with biometric technology such as retina based authentication and finger print authentication. But, these techniques are not scalable enough when there is need for transmitting highly sensitive information through the network.

Therefore, a system and method that will successfully address the aforementioned problems is still considered to be one of the challenges of the field. Furthermore, a system that will enable the user to remember the complex passwords without compromising user's credentials is also considered to be a problem which requires to be solved.

SUMMARY

Embodiments of the present disclosure present technological improvements as solutions to one or more of the above-mentioned technical problems recognized by the inventors in conventional systems. For example, in one embodiment, a system for image based location specific password construction and authentication comprises a system repository configured to store a pre-determined set of rules and a system processor cooperating with the system repository to receive the stored rules in order to provide system processing commands based on the possessed functional elements. The system comprises a data storage repository that stores captured images, geographical locations and timestamps when the images were captured for password construction and authentication and also stores username and demographic information of users who capture images. A display present in the system displays at least one image for password construction and authentication. The system also comprises a user registration module that cooperates with the system processor, the data storage repository and the display, and provides under influence of the system processing commands, image based password construction. This user registration module comprises a user information input module that accepts demographic information and a valid username of a user and cooperates with the data storage repository to store user information and username. It also comprises a graph walk generator that generates a graph for guiding users to capture images for password construction. The graph walk generator includes a first user-location identifier that cooperates with a first GPS navigation device and identifies geographical locations of users and the time at which the geographical locations are identified. The graph walk generator also includes a lat-long identifier that cooperates with the first user-location identifier and identifies latitude and longitude of identified geographical locations. A grid maker present in the graph walk generator cooperates with the first user-location identifier and the lat-long identifier to receive the users' geographical locations along with the latitude and longitude details, and creates grid boundaries for a pre-determined area around users' geographical location. The graph walk generator also includes a locations identifier that cooperates with the grid maker to receive a grid boundary and identifies a plurality of geographical locations suitable for capturing images within the grid boundary. An image checker present in the graph walk generator then cooperates with the locations identifier to receive identified geographical locations and checks from the data storage repository the stored captured images relevant to the identified geographical locations to determine geographical locations suitable for capturing images within the grid boundary. A graph plotter present in the graph walk generator then cooperates with the image checker to receive the determined suitable geographical locations and plots a map including directions to geographical locations associated with the latitude and longitude information where the images need to be captured for password construction. This map is then displayed on the display. The user registration module comprises an image processor that cooperates with the system processor and processes under the influence of system processing commands, images captured by the user. This image processor comprises an image input module, an image comparator, an object finder and an identifier allotter. The image input module accepts images captured by users based on the displayed map, the images including a plurality of objects and associated with latitude and longitude of locations of capture and timestamps for the times of capture. The image comparator cooperates with the image input module to receive images captured by users and compares received images with images stored in the data storage repository to determine unique captured images usable for password construction. The object finder cooperates with the image comparator to receive the determined unique captured images and identifies a plurality of objects present within the images. The object finder comprises an object input module which cooperates with the display to enable users to identify and select a plurality of objects within the images. The identifier allotter then cooperates with the object finder to receive the unique captured images with the identified objects and allots an unique identifier to each of the objects within the images and also allots unique numbers to the Images to associate the images to the user, the identifier allotter is further configured to transmit the images having unique numbers and containing objects having unique identifiers to the data storage repository for storage. A password creator present in the user registration module cooperates with the system processor, and the image processor, and constructs under the influence of system processing commands, a password using the images associated with unique numbers and containing objects having unique identifiers. The password creator comprises an image analyzer, a first object sequence input module, a first crawler extractor and a first hash value calculator. The image analyzer analyzes the images processed by the image processor and determines images suitable for password construction. The first object sequence input module cooperates with this image analyzer to receive the suitable images containing a plurality of objects and accepts from the user a selection of objects within the images in a user determined sequence. The first crawler extractor cooperates with the first object sequence input module and then crawls through the data storage repository and extracts unique identifiers corresponding to the objects selected by the user. The first hash value calculator then cooperates with the first crawler extractor to receive the unique identifiers and calculates a hash value for each of the suitable images based on the received unique identifiers of the selected objects. These hash values corresponding to each of the suitable images are then stored in the data storage repository. A user authentication module present in the system cooperates with the system processor, the data storage repository and the display, and provides image based authentication under influence of the system processing commands, wherein the image is used only once for providing one-time image based authentication.

In another embodiment, there is provided a method for image based location specific password construction and authentication, the method comprises the following:

storing a pre-determined set of rules and providing system processing commands based on the said rules;

storing captured images, geographical locations and timestamps when the images were captured for password construction and authentication in a data storage repository and also username and demographic information of users who capture images;

displaying at least one image for password construction and authentication;

providing under influence of the system processing commands, image based password construction, said step of providing image based password construction comprises the following:

accepting demographic information and a valid username of a user and storing user information and username;

generating a graph for guiding users to capture images for password construction, said step of graph generation comprises the following:

identifying geographical locations of users and the time at which the geographical locations are identified;

identifying latitude and longitude of identified geographical locations;

creating grid boundaries for a pre-determined area around users geographical location based on the users' geographical locations and the latitude and longitude details;

identifying a plurality of geographical locations suitable for capturing images within a grid boundary;

checking the stored captured images relevant to identified geographical locations and determining geographical locations suitable for capturing images within said grid boundary; and plotting a map including directions to geographical locations associated with the latitude and longitude information where the images need to be captured for password construction, and displaying said map;

processing under influence of the system processing commands, images captured by the user, said step of processing images captured by the user comprising the following:

accepting images captured by users based on the displayed map, said images including a plurality of objects and associated with latitude and longitude of locations of capture and timestamps for the times of capture;

comparing received images with stored images and determining unique captured images usable for password construction;

identifying a plurality of objects present within the images, and also enabling users to identify and select a plurality of objects within the images; and allotting an unique identifier to each of the objects within said images and also allotting unique numbers to said images to associate said images to the user and storing said images having unique numbers and containing objects having unique identifiers;

constructing under influence of the system processing commands, a password using the images associated with unique numbers and containing objects having unique identifiers, said step of password construction comprising the following:

analysing the processed images and determining images suitable for password construction;

accepting from the user a selection of objects within the images in a user determined sequence;

crawling through the data storage repository and extracting unique identifiers corresponding to the objects selected by the user;

calculating a hash value for each of the suitable images based on the received unique identifiers of said selected objects, and storing the hash values in the data storage repository corresponding to each of the suitable images; and providing image based authentication under influence of the system processing commands wherein said image is used only once for providing one-time image based authentication.

An objective of the present disclosure is to provide a computer implemented system and method for password generation and authentication.

Another objective of the present disclosure is to provide a system that guides a user to capture images for password construction based on the user's geographical location and demographic information.

Yet another objective of the present disclosure is to provide a system enabled to identify various objects in the images captured by the user.

Yet another objective of the present disclosure is to provide a system enabled to generate a password from sequence of objects selected by a user from the images captured by the user.

Yet another objective of the present disclosure is to provide a system that displays images based on the user's geographical location and demographics of the user which enables the user to recognize the password easily.

Yet another objective of the present disclosure is to provide a system that utilizes photographic memory of a user for the purpose of authentication.

Yet another objective of the present disclosure is to provide a system that provides image based authentication.

Yet another objective of the present disclosure is to provide a system that recommends password based on color variation in the user captured images.

Yet another objective of the present disclosure is to provide a handheld device based system and method for password construction and authentication.

Other objectives and advantages of the present disclosure will be more apparent from the following description when read in conjunction with the accompanying figures, which are not intended to limit the scope of the present disclosure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a computer implemented system and method to limit issues with existing authentication mechanisms. The envisaged system helps users to recognize the password in terms of objects in an image rather than recalling the alphanumeric passwords. Objects within any image are the entities present in an image, thus, each image consists objects. For example a scene from an image includes a child playing near a tree on which birds have settled and the child's mother is gardening nearby a house which has a dog house adjacent to it where a dog is playing with a ball. This image will have objects such as a child, a tree, birds, dog, house and a lady (mother) which will be used for authentication.

In one embodiment of the invention, images are typically more intuitive than text/characters and the images give more meaningful information than text. Images have more information than text and hence images can be made to be more secure. Every image consists of meaningful objects that are utilized by the system of the present disclosure to provide password construction and authentication.

In another embodiment of the invention, a graph walk generator present in the system guides a user to take unique pictures/images/photographs from user's geographical location which helps the user to recognize password easily in future. The system helps in creating and maintaining a strong password by using pseudorandom image presenter. It also allows a user to aid his photographic memory to get authenticated to the system.

The present disclosure allows a user to use his handheld device enabled to communicate over a network to select objects (meaningful regions) from the images as password for authentication. These handheld devices include mobile phones and tablets that can communicate with the system over Internet. Every user generates certain number of images by capturing images in vicinity with the help of the graph walk generator. Consequently, password generation is split across space and time. Subsequently, system identifies objects in each image and also allows a user to select an object from the image with the help of an object input module. Thus, the user can select as many objects in sequence as he wants for creating a password.

In another embodiment of the invention, based upon the geographical location and demographics of the user, the system presents images captured by the user along with other similar images for authentication. Thus, the images captured by the user appear relevant to the user and help the user to recognize password by choosing the objects within the images in a sequence chosen by the user during password construction. The objects within the images prevent social engineering attacks on the mechanism and provide users a secure authentication mechanism. Once a stored image is used for authenticating a user, it is removed from the system. Thus, the captured images can only be used once for the purpose of authentication. Considering an example, a user is guided by a map for capture images. This map is plotted by the system in order to enable user to select objects in the captured images as passwords. Over a period of time, if the user has 100 images, while authenticating, based upon the user's demographics and geographical location, the system shows some images from which the user has to select a specific image and objects from that image to get authenticated. Once the user is authenticated, that image is removed from the system and user thus has 99 images for next authentication. When the number of images in the data storage repository reduces to a pre-determined value, the system requests the user to walk a path based on a plotted map and take more images for creating image based passwords. This ensures authentication security for the user when the system is being used in a secure or an unsecure environment.

Figure 1:
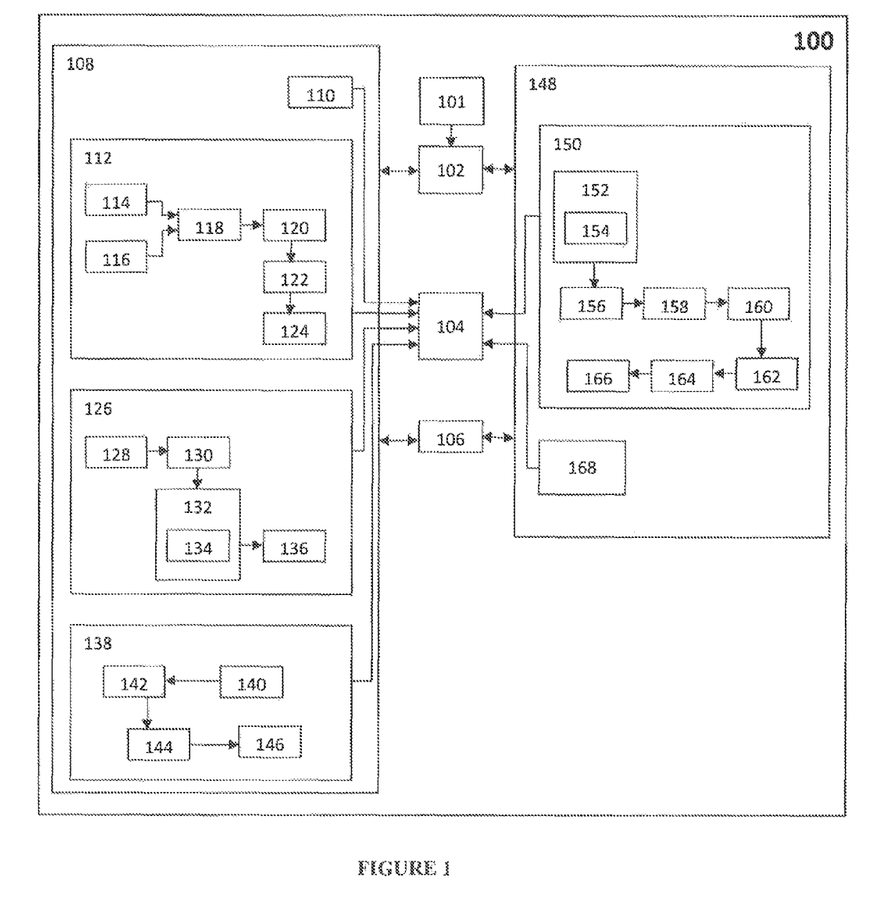
FIG. 1 illustrates a schematic of the system for image based location specific password construction and authentication.

In another embodiment of the invention, referring to the accompanying drawings, FIG. 1 illustrates a schematic of the system 100 for image based location specific password construction and authentication. The system 100 comprises a system repository 101 that stores a pre-determined set of rules which are used by a system processor 102. The system processor 102 based on functional elements of the system processor 102 and the rules provided by the system repository 101, provides system processing commands which control and coordinate with different modules of the system 100. The system processor 102 also cooperates with external entities like websites which request authentication. The system also includes a data storage repository 104 that stores images captured by the users along with geographical locations where the images were captured and timestamps when the images were captured for password construction and authentication and also stores usernames and demographic information of users who have captured the images. The system further includes a display 106 that displays images for password construction and authentication.

In another embodiment of the invention, a user registration module 108 present in the system 100 allows users to register to the system by providing user demographic information and a unique user name. The user registration module 108 provides guidance to the user for construction of password that is then stored for future authentication. The user registration module 108 includes a user information input module 110 which accepts demographic information and a valid unique username of a user and stores it in the data storage repository 104 for future use. A graph walk generator 112 present in the user registration module 108 generates graphs to guide each user to take photographs (each image is taken at different geographical locations). This keeps the password generation split/spread across space and time. The graph walk generator 112 includes a first user-location identifier 114 that cooperates with GPS navigation device present in the user's handheld device and identifies geographical location of the user and time at which the geographical location is identified. A lat-long identifier 116 then identifies latitude and longitude of the identified geographical location. Based on this information a grid maker 118 creates a grid boundary for a pre-determined area around the user's geographical location. There are multiple geographical locations suitable for capturing images within the grid boundary which are identified by a location identifier 120. Based on these locations an image checker 122 checks from the data storage repository 104 the stored images relevant to the identified geographical locations and determines geographical locations suitable for capturing images within the grid boundary. Based on the determined locations a graph plotter 124 plots a map including directions to geographical locations associated with the latitude and longitude information where the images need to be captured for password construction. This map is then displayed on the display 106 to guide the user.

In another embodiment of the invention, the user registration module 108 also includes an image processor 126 that processes the captured Images to identify objects for password construction. An image input module 128 present in the image processor 126 accepts images captured by the user based on the displayed map, these images include multiple objects and have an associated latitude and longitude of the location of capture and timestamp of the time of capture. An image comparator 130 compares these images with the images stored in the data storage repository 104 to determine unique captured images usable for password construction. During the comparison, the Image comparator 130 finds out whether the image histogram or the Images are similar to each other. On determining unique captured images an object finder 132 present in the image processor 126 identifies objects in the images by using techniques including face detection, image segmentation and pattern matching. It also allows user to identify objects by providing a tool to select objects. These user selected objects are accepted by an object input module 134. Once the objects are selected an identifier allotter 136 allots a unique identifier to each of the objects within the images and also allots unique number to the images to associate the images to the user. This identifier allotter 136 stores the images having unique numbers and containing objects having unique identifiers in the data storage repository 104.

In another embodiment of the invention, the user registration module 108 further comprises a password creator 138 that recommends a password to the user considering maximum color variation. A user has to select images along with the objects present in those images sequentially to create the password. The password creator 138 includes an image analyzer 140 which analyzes the images processed by the image processor 126 and determines images suitable for password construction. In order to analyze the images, captured/uploaded Images are compared with other images stored by the same user. Each pixel in the image is a composition of Red (R), Green (G) and Blue (B) value and each value varies from 0 to 255. The system 100 uses R, G, B value of each pixel and calculates a single (R, G, B) value as follows:

$$R \text{ value of an image} = \frac{r_1 + r_2 + r_3 + \ldots + r_n}{n}$$

Similarly, values for G and B are calculated as:

$$G \text{ value of an image} = \frac{g_1 + g_2 + g_3 + \ldots + g_n}{n}$$

$$B \text{ value of an image} = \frac{b_1 + b_2 + b_3 + \ldots + b_n}{n}$$

Thus, a single (R, G, B) value for an image is obtained and (R, G, B) value of other images are calculated. The image analyzer 140 then calculates a HEX of all the images from the calculated RGB values. For example, if a calculated RGB value of an image is RGB (0, 0, 255) then the HEX value would be #0000FF.

To present intuitive images to the user, the system 100 identifies images with maximum color variation. As RGB values vary from 0 to 255 and colors vary from RGB (0, 0, 0) to RGB (255,255,255) i.e. #000000 to #FFFFFF, if a system requires showing only "I" images from "N" images with maximum color variation, the images in "I" categories are categorized. To find out images with maximum color variation in those images, the image analyzer 140 chooses values from the spectrum of colors which are placed equidistance. Subsequently, it finds out the closest match to the identified spectrums.

For example, if the value of I=2 then first value would be #000000 and second value #FFFFFF. Consider that the system has six images i.e. N=6 and system wants to recommend two images to the user, the system finds out the HEX values of the six images. Considering, that following are the HEX values:

Image 1: #FF0000
Image 2: #2C2C00
Image 3: #010101
Image 4: #00FF00
Image 5: #FFFF00
Image 6: #0000FF To compare the images with the given points i.e. #000000 and #FFFFFF, these values are subtracted from both the points as follows:

Subtracting from #000000–Image 1: #FF0000 Image 2: #2C2C00 Image 3: #010101 Image 4: #00FF00 Image 5: #FFFF00 Image 6: #0000FF Subtracting from #FFFFFF–Image 1: #0000FF Image 2: #D3D3FF Image 3: #FEFEFE Image 4: #FF00FF Image 5: #0000FF Image 6: #FFFF00

Now, the value obtained after summing the RGB values is #010101 which is closes to value #00000 and #FFFF00 is close to value #FFFFFF. Thus, the system shows these two images to the user to selects objects for password construction.

These images are displayed on the display 106 and the user is prompted to select the objects in a particular sequence. A first object sequence input module 142 accepts from the user a selection of objects within the images in a user-determined sequence. A first crawler extractor 144 based on these selected objects crawls through the data storage repository 104 and extracts unique identifiers corresponding to the objects selected by the user. A first hash value calculator 146 utilizes these extracted unique identifiers and calculates a hash value for each of the suitable images based on the received unique identifiers of the objects selected in a sequence, these hash values are then stored in the data storage repository 104 corresponding to each of the suitable images. In one embodiment the hash values are calculated using cryptographic hash function SHA-1. For example, considering that there are 20 objects having unique identifiers as O1, O2, O3, O4, till O20 and a user selects objects in sequence as O2, O8, O3, O7, O1, O18, and O10.

Then, the hash value K of the selected sequence is calculated as:

$$K=SHA1(\text{``O2O8O3O7O1O18O10''})$$

In another embodiment of the invention, the system 100 further comprises a user authentication module 148 that displays various images to the user based on the user's geographical location for purpose of authentication. The user authentication module 148 includes an image presenter unit 150 that displays the images based on geographical locations and demography of the user. It shows images which are most relevant to the user. The image presenter unit 150 shuffles the displayed images to the user after certain time duration. The image presenter unit 150 presents images to the user based on the user's geographical location and demographic information and accepts a selection of objects in a sequence for authenticating the user based on the accepted password. The image presenter unit 150 includes a second user-location identifier 152 which cooperates with a second GPS navigation device and identifies geographical location of the user. The second user-location Identifier 152 includes a user-information identifier 154 that accepts a username from the user to identify demographic information of the user from the data storage repository 104. A second crawler extractor 156 present in the Image presenter unit 150 uses the geographical location and the demographic information, and crawls through the data storage repository 104 to extract stored user captured images and other stored images corresponding to the identified geographical location. The second crawler extractor 156 also extracts stored hash values associated with the user captured images from the data storage repository and stores the extracted hash values in a temporary repository (not shown in the figure). An image selector 158 then selects suitable images including user captured images and other stored images captured at the identified geographical locations and displays the selected images containing a plurality of objects on the display 106. A second object sequence input module 160 accepts from the user a selection of the displayed user captured images from the displayed images and also accepts a selection of objects present in the selected user captured images in a user determined sequence. A third crawler extractor 162 crawls through the data storage repository 104 and extracts unique identifiers corresponding to the objects selected by the user. A second hash value calculator 164 utilizes these unique identifiers and calculates a hash value for each of the displayed images based on the received unique identifiers of the selected objects. A hash value comparator 166 uses the calculated hash values and the extracted hash values, and compares them for each of the displayed user captured images to authenticate the user. The user authentication module 148 then deletes/removes images used to authenticate the user from the storage data repository 104. A threshold for number of images associated to each user is pre-determined. When the number of these images in the data storage repository 104 reduces below the pre-determined value, the system 100 requests the user to walk a path based on a plotted map and capture more images for creating image based passwords.

Figure 2:
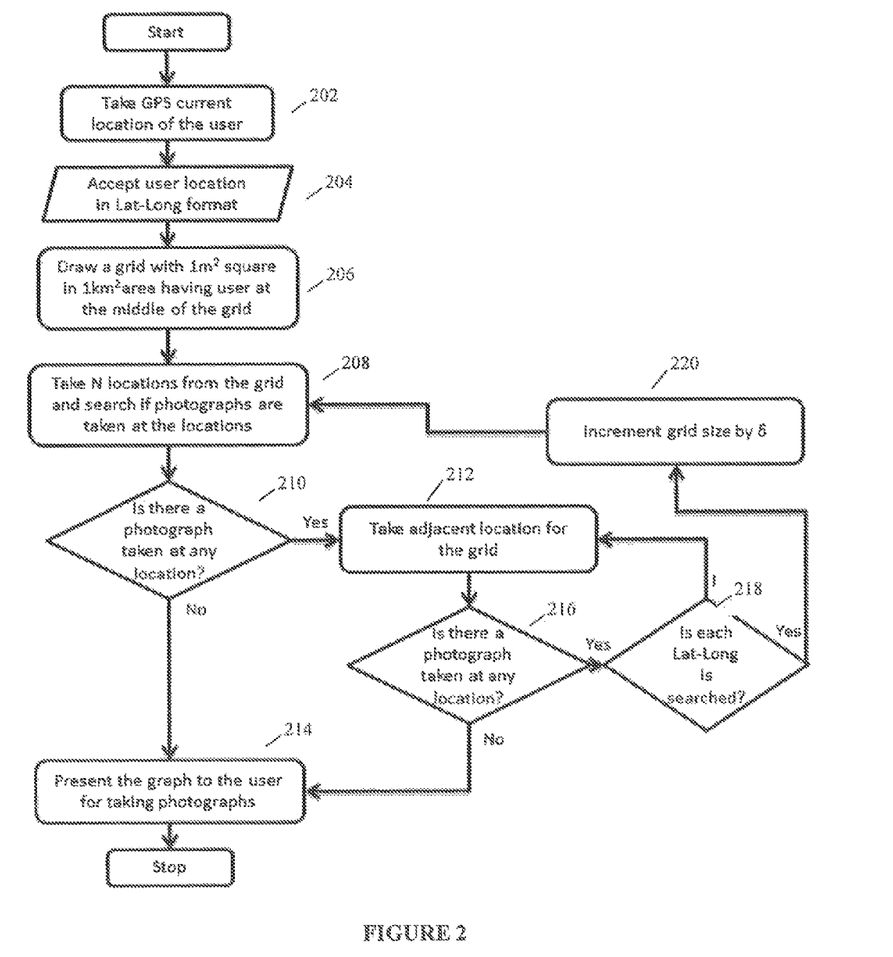
FIG. 2 illustrates a flow diagram for generating graph that guides users to take photographs for password construction.

In another embodiment of the invention, referring to the accompanying drawings, FIG. 2 illustrates a flow diagram for generating graph that guides users to take photographs/images for password construction. A graph walk generator present in the system of the present disclosure generates a graph for guiding the user to capture images for password construction based on the user location. The graph walk generator takes GPS information of the current geographical location of the user 202 and also accepts latitude and longitude information related to the user's current geographical location 204. Based on this information in one embodiment, the graph walk generator draws a square grid with 1 m² and in 1 km² area having user in the middle of the grid 206. It is assumed that GPS provides approximately accurate and acceptable resolution for 1 meter. Therefore considering an example, in a village, if a general area covered by the village is around 700 meters to 1 kilometer, and a grid is plotted for 1 km² with each cube being 1 m², then we get 1000×1000 co-ordinates. If the number of location for each user is M where e.g. M<20, a very big number will be obtained which will be greater than the population. Now considering a city, the number of co-ordinates in an area of 1 km² will always be more than density of population in that 1 km² area. Thus, a user is always able to get unique photographs. Additionally, the password images are split across space and time, that is, each image has Lat-Long and timestamp stored along with the image in the data storage repository. Thus, if a user takes a photograph after some duration e.g. after a year then the photograph is not always be same as the objects might differ, camera and resolution, etc. will also be different. Once the grid is plotted, N locations from the grid are considered and it is searched in the data storage repository whether any photographs are taken at those locations 208. If a photograph is not taken 210, then the graph is plotted and displayed to the user to guide the user in taking photographs 214. If a photograph is taken 210, then another adjacent location is taken for the grid 212 and it is checked whether a photograph is taken at any location in the grid 216. If a photograph is taken at that location, each Lat-Long is searched 218 and if the Lat-Long is same the grid size is increased. If it is not the same then another location for grid is taken 212. Once the locations are identified, a graph is plotted and presented to the user 214.

Figure 3A:
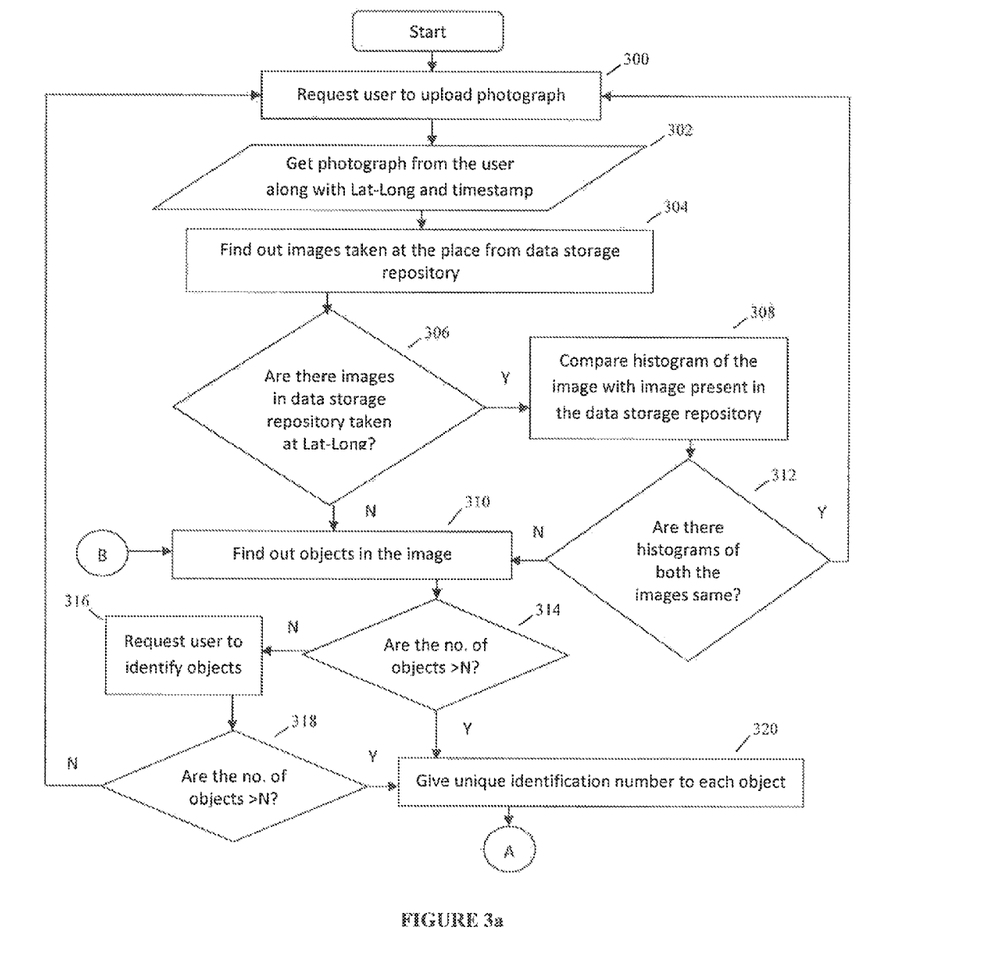
FIGS. 3a and 3b illustrate a flow diagram for image based location specific password construction.
Figure 3B:
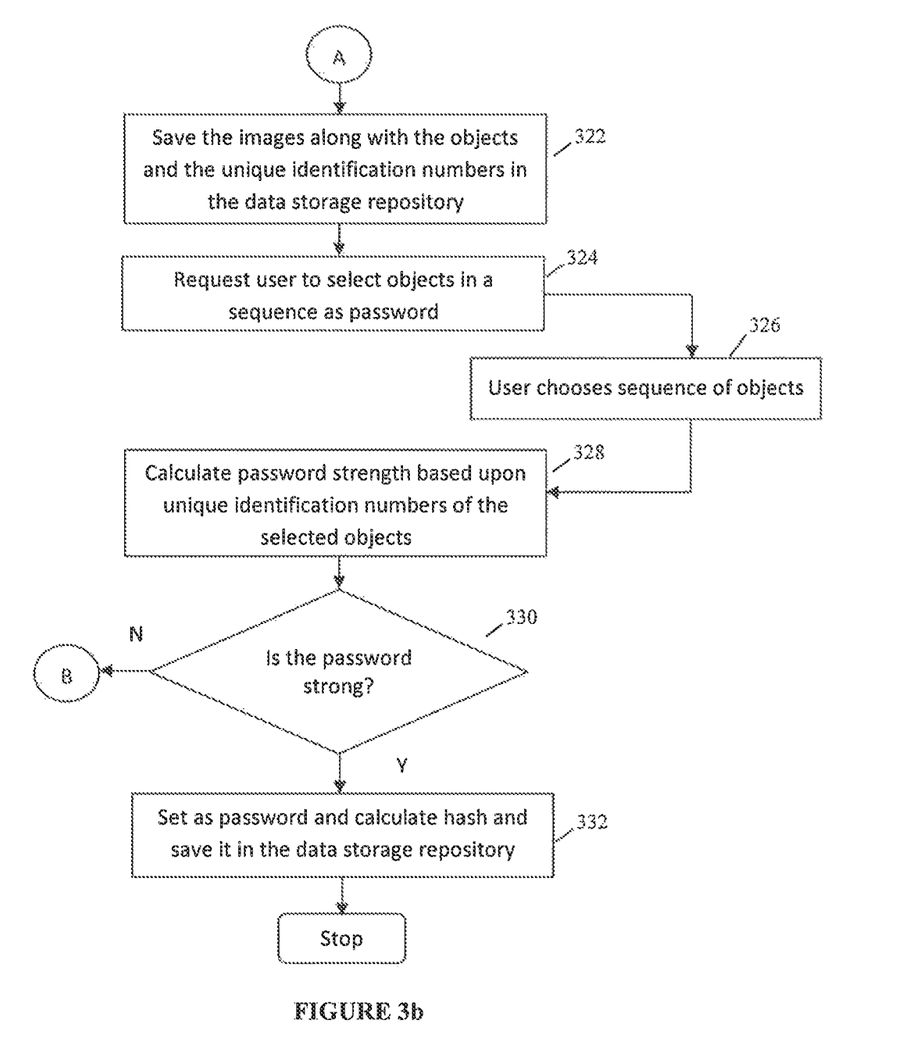

In another embodiment of the invention, referring to the accompanying drawings, FIGS. 3a and 3b illustrates a flow diagram for image based location specific password construction. Once a graph is displayed to the user based on the user's geographical location, the user has to take photographs as the displayed locations in order to construct a password for authentication. The system requests the user to upload the photographs taken by the user 300 as per the locations provided to the user in the graph. Taken photographs are appended with the Lat-Long of the location from where the user captured the photographs and timestamp denoting the time when the photograph was taken 302. The system then searches if any images were captured at that location by searching the data storage repository 304. If the images in the data storage repository are not taken at the same Lat-Long 306, objects within the captured images are detected 310. If there are images in the data storage repository that are taken at the same Lat-Long 306, histogram of the captured image is compared with the histogram of the image stored in the repository 308. If both the histograms are same 312, user is requested to upload another photograph from that location 300. If both the histograms are different 312, objects within the captured images are detected 310. A check is then performed to determine if the number of objects in an image is greater than a pre-determined threshold for number of objects 314. If the number of objects is insufficient, user is requested to identify objects within the captured image 316. A user can draw a boundary across the object using a pencil type of tool suitable to the user's handheld device. A check is again performed to check the number of objects 318. If the objects are still insufficient for password construction, the user is requested to upload another photograph 300. If the number of objects is sufficient 314 318, a unique identification number is allotted to each object 320. The captured images along with the objects and the unique identification numbers are then stored in the data storage repository 322. A user is then requested to select objects in a sequence as a password 324. Once the user chooses sequence of the objects 326, password strength is calculated based on the unique identification numbers of the selected objects 328. For example, when "n" images are displayed to the user, a user can select "j" images and from "m" objects "i" objects as follows: Number of ways a user can select any number (greater than 1) of objects from an image sequentially as $$\Sigma_{i=1}^{m}(m,P,i)$$

Where, (m, P, i) is the distinct number of ways of selecting "I" objects from "m" objects sequentially.

Now, number of ways a user can select any number of objects (>1) from any number on images (>1) can be calculated as $$\Pi_{j=1}^{n}(\Sigma_{i=1}^{m_j}(m_j,P,i))$$

Where, $m_j$ is the number of objects in $j^{th}$ Image.

The number of ways "j" number of images can be selected from "n" images and any number of objects can be selected from any number of images is given by $$(N,C,n)(\Pi_{j=1}^{n}(\Sigma_{i=1}^{m_j}(m_j,P,i))$$

Where, (N, C, n) is the number of ways selecting "n" images from "N" images.

Now, number of ways of selecting any number of images from "N" and selecting any number of objects from those images is calculated as $$\Sigma_{n=1}^{N}((N,C,n)(\Pi_{j=1}^{n}(\Sigma_{i=1}^{m_j}(m_j,P,i))))$$

Based upon the above equation, even if a user selects minimum number of images and objects, it is challenging to guess the password of the user.

For example, assuming that a user is shown N=2 Images on the display of user's handheld device and the user is request to authenticate with the system. The user can select any number of images from n=1 to 2. Considering a set of objects in each as O={12, 9}

The number of ways a password can be selected can be calculated as:
Number of ways=$3.85 \times 10^{15}$ Thus, when a user does not know the password there are $3.85 \times 10^{15}$ when only 2 images are considered. However, as the number of images increases, it increases number of objects and consequently, strength of the image based password increases.

Once the password strength is calculated a check is then performed to check whether the password is strong 330. If the password is not strong, all the steps from finding out objects within the Images 310 are repeated. When the calculated password strength is strong 330 that password is set and a hash value is calculated and saved in the data storage repository 332 for use during authentication.

Figure 4:
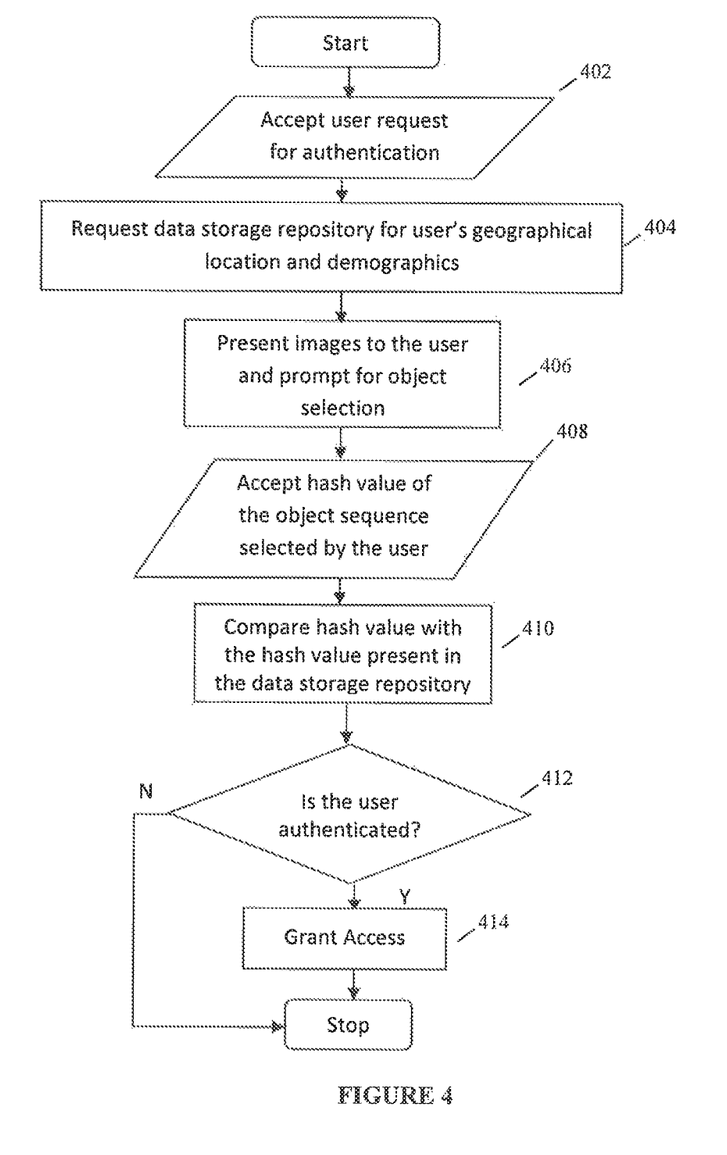
FIG. 4 illustrates a flow diagram for image based location specific authentication.

In another embodiment of the invention, referring to the accompanying drawings, FIG. 4 illustrates a flow diagram for image based location specific authentication. After successful registration, a user can use the system to get authenticated without having to remember long alphanumeric password. The system accepts the user's request for authentication 402 and requests the user to provide his username. Based on the username and user's geographical location, demographics are requested from the data storage repository 404. Images based on user's geographical location and demographics are presented to the user on user's handheld device and the user is prompted to select objects in a sequence 406. Whenever a user tries to authenticate with the system, the system reads the geographical location of the user and the demographics of the user such as age, education, gender, occupation, etc. Based on such demographics, the system tries to identify similar demographic profiles. The photographs uploaded by users having similar profile are identified from nearby geographical area. Thus, whenever a user tries to authenticate, the system presents images from which the user has chosen objects along with other images. Others images include images uploaded by the user and the image obtained by finding photographs taken near user's geographical location and photographs uploaded by the users whose profiles match with the user and who have taken photographs in nearby locations. A user has to open the image to select objects sequentially. The user has to select subsequent objects sequence from different chosen images. A hash value is then calculated based on the unique identifiers of the objects selected in a sequence 408 which are extracted from the data storage repository. This calculated hash value is compared with the hash value stored in the data storage repository for that particular image based on the sequence selected at the time of the registration by the user 410. If the hash values are same the user is authenticated. A check is performed to check is the user is authenticated 412. Access is granted to the user on successful authentication 414.

In another embodiment of the invention, the computer implemented system and method for image based location specific password construction and authentication described herein above has several technical advancements including but not limited to the realization of:
- a computer implemented system and method for password generation and authentication;
- a system that guides a user to capture images for password construction based on the user's geographical location and demographic information;
- a system enabled to identify various objects in the images captured by the user;
- a system enabled to generate a password from sequence of objects selected by a user from the images captured by the user;
- a system that displays images based on the user's geographical location and demographics of the user which enables the user to recognize the password easily;
- a system that utilizes photographic memory of a user for the purpose of authentication;
- a system that provides image based authentication;
- a system that recommends password based on color variation in the user captured images; and
- a handheld device based system and method for password construction and authentication.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for image based location specific password construction and authentication, said system comprising:
- a system repository configured to store a pre-determined set of rules;
- a system processor cooperating with the system repository to receive said rules and possessing functional elements to provide system processing commands;
- a data storage repository configured to store captured images, geographical locations and timestamps when the Images were captured for password construction and authentication and also username and demographic information of users who capture images;
- a display configured to display at least one image for password construction and authentication;
- a user registration module cooperating with the system processor, the data storage repository and the display, and configured to provide under influence of the system processing commands, image based password construction, said user registration module comprising:
    - a user information input module configured to accept demographic information and a valid username of a user and cooperating with the data storage repository to store user information and username;
    - a graph walk generator configured to generate a graph for guiding users to capture images for password construction, said graph walk generator comprising:
        - a first user-location identifier cooperating with a first GPS navigation device and configured to identify geographical locations of users and the time at which the geographical locations are identified;
        - a lat-long identifier cooperating with the first user-location identifier and configured to identify latitude and longitude of identified geographical locations;
        - a grid maker cooperating with the first user-location identifier and the lat-long identifier to receive the users' geographical locations along with the latitude and longitude details and configured to create grid boundaries for a pre-determined area around users geographical location;
        - a locations identifier cooperating with the grid maker to receive a grid boundary and configured to identify a plurality of geographical locations suitable for capturing images within said grid boundary;
        - an image checker cooperating with the locations identifier to receive identified geographical locations and configured to check from the data storage repository the stored captured images relevant to the identified geographical locations to determine geographical locations suitable for capturing images within said grid boundary; and
        - a graph plotter cooperating with the image checker to receive the determined suitable geographical locations and configured to plot a map including directions to geographical locations associated with the latitude and longitude information where the images need to be captured for password construction, and also configured to display said map on the display;

an image processor cooperating with the system processor and configured to process under the influence of system processing commands, images captured by the user, said image processor comprising:

an image input module configured to accept images captured by users based on the displayed map, said images including a plurality of objects and associated with latitude and longitude of locations of capture and timestamps for the times of capture;

an image comparator cooperating with the image input module to receive images captured by users and configured to compare received images with images stored in the data storage repository to determine unique captured images usable for password construction;

an object finder cooperating with the image comparator to receive the determined unique captured images and configured to identify a plurality of objects present within the images, said object finder comprising an object Input module configured to cooperate with the display to enable users to identify and select a plurality of objects within the images; and an identifier allotter cooperating with the object finder to receive the unique captured images with the identified objects and configured to allot an unique identifier to each of the objects within said images and also allot unique numbers to said images to associate said images to the user, said identifier allotter further configured to transmit said images having unique numbers and containing objects having unique identifiers to the data storage repository for storage;

a password creator cooperating with the system processor, and the image processor, and configured to construct under the influence of system processing commands, a password using the images associated with unique numbers and containing objects having unique identifiers, said password creator comprising:

an image analyser configured to analyse the images processed by the image processor and determine images suitable for password construction;

a first object sequence input module cooperating with the image analyser to receive the suitable images containing a plurality of objects and configured to accept from the user a selection of objects within the images in a user determined sequence;

a first crawler extractor cooperating with the first object sequence input module and configured to crawl through the data storage repository and extract unique identifiers corresponding to the objects selected by the user;

a first hash value calculator cooperating with the first crawler extractor to receive the unique identifiers and configured to calculate a hash value for each of the suitable images based on the received unique identifiers of said selected objects, and also configured to store the hash values in the data storage repository corresponding to each of the suitable images;

and a user authentication module cooperating with the system processor, the data storage repository and the display, and configured to provide image based authentication under influence of the system processing commands, wherein said image is used only once for providing one-time image based authentication.

2. The system of claim 1, wherein said user authentication module providing one-time image authentication and comprising:

an image presenter unit configured to present images to a user based on geographical location and demographic information of the user, for accepting a password and authenticating the user based on the accepted password, said image presenter unit comprising:

a second user-location identifier cooperating with a second GPS navigation device and configured to identify geographical location of the user, said second user-location identifier comprising a user-information identifier configured to accept a username from the user to identify demographic information of the user;

a second crawler extractor cooperating with the second user-location identifier to receive said geographical location and said demographic information, and configured to crawl through the data storage repository to extract stored user captured images based on received geographical location and demographic information and also extract other stored images corresponding to said identified geographical location, said second crawler extractor further configured to extract stored hash values associated with said user captured images from the data storage repository and store the extracted hash values in a temporary repository;

an image selector cooperating with the second crawler extractor to receive the extracted stored images containing a plurality of objects and configured to select suitable images including user captured images and other stored images captured at said identified geographical location, said image selector further cooperating with the display to display selected images containing a plurality of objects;

a second object sequence input module cooperating with the image selector and the display, and configured to accept from the user a selection of the displayed user captured images from said displayed images and further accept a selection of objects present in said selected user captured images in a user determined sequence;

a third crawler extractor cooperating with the second object sequence input module and configured to crawl through the data storage repository and extract unique identifiers corresponding to the objects selected by the user;

a second hash value calculator cooperating with the third crawler extractor to receive the unique identifiers and configured to calculate a hash value for each of the displayed images based on the received unique identifiers of said selected objects;

a hash value comparator cooperating with the second hash value calculator to receive the calculated hash values and the temporary repository to receive extracted hash values, and configured to compare the stored hash values with the extracted hash values for each of said displayed user captured images to authenticate the user; and an image remover configured to delete from said data storage repository, on successful authentication, the images selected by the user for authentication.

3. The system of claim 1, wherein said image comparator determines images suitable for password construction by comparing histogram, latitude and longitude, and timestamps of the received images with the histogram, latitude and longitude, and timestamps of the images stored in the data storage repository.

4. The system of claim 1, wherein said object finder identifies a plurality of objects present within the images by techniques selected from a group consisting of face detection, image segmentation, pattern matching and any combinations thereof.

5. The system of claim 1, wherein said image analyser determines images suitable for password construction by calculating maximum colour variation.

6. The system of claim 2, wherein said image presenter unit pseudo-randomly presents images to the user and shuffles the displayed images after pre-determined time duration.

7. A method for image based location specific password construction and authentication, said method comprising the following:

storing a pre-determined set of rules and providing system processing commands based on the said rules;

storing captured images, geographical locations and timestamps when the images were captured for password construction and authentication in a data storage repository and also username and demographic information of users who capture images;

displaying at least one image for password construction and authentication;

providing under influence of the system processing commands, image based password construction, said step of providing image based password construction comprises the following:

accepting demographic information and a valid username of a user and storing user information and username;

generating a graph for guiding users to capture images for password construction, said step of graph generation comprises the following:

identifying geographical locations of users and the time at which the geographical locations are identified;

identifying latitude and longitude of identified geographical locations;

creating grid boundaries for a pre-determined area around users geographical location based on the users' geographical locations and the latitude and longitude details;

identifying a plurality of geographical locations suitable for capturing images within a grid boundary;

checking the stored captured images relevant to identified geographical locations and determining geographical locations suitable for capturing images within said grid boundary; and plotting a map including directions to geographical locations associated with the latitude and longitude information where the images need to be captured for password construction, and displaying said map;

processing under influence of the system processing commands, images captured by the user, said step of processing images captured by the user comprising the following:

accepting images captured by users based on the displayed map, said images including a plurality of objects and associated with latitude and longitude of locations of capture and timestamps for the times of capture;

comparing received images with stored images and determining unique captured images usable for password construction;

identifying a plurality of objects present within the images, and also enabling users to identify and select a plurality of objects within the images; and allotting an unique identifier to each of the objects within said images and also allotting unique numbers to said images to associate said images to the user and storing said images having unique numbers and containing objects having unique identifiers;

constructing under influence of the system processing commands, a password using the images associated with unique numbers and containing objects having unique identifiers, said step of password construction comprising the following:

analysing the processed images and determining images suitable for password construction;

accepting from the user a selection of objects within the images in a user determined sequence;

crawling through the data storage repository and extracting unique identifiers corresponding to the objects selected by the user;

calculating a hash value for each of the suitable images based on the received unique identifiers of said selected objects, and storing the hash values in the data storage repository corresponding to each of the suitable images;

and providing image based authentication under influence of the system processing commands wherein said image is used only once for providing one-time image based authentication.

8. The method of claim 7, wherein said step of providing one-time image based authentication comprises the following:

presenting images to a user based on geographical location and demographic information of the user, for accepting a password and authenticating the user based on the accepted password, said step of presenting images comprising the following:

identifying geographical location of the user and accepting a username from the user to identify demographic information of the user;

crawling through the data storage repository and extracting stored user captured images based on received geographical location and demographic information and extracting other stored images corresponding to said Identified geographical location, and also extracting stored hash values associated with said user captured images from the data storage repository and store the extracted hash values in a temporary repository;

selecting suitable images including user captured images and other stored images captured at said identified geographical location, and displaying selected images containing a plurality of objects;

accepting from the user a selection of the displayed user captured images from said displayed images and further accepting a selection of objects present in said selected user captured images in a user determined sequence;

crawling through the data storage repository and extracting unique identifiers corresponding to the objects selected by the user;

calculating a hash value for each of the displayed images based on the extracted unique identifiers of said selected objects;

comparing the calculated hash values with the hash values extracted from the data storage repository for each of said displayed user captured images to authenticate a user; and deleting from said data storage repository, on successful authentication, the images selected by the user for authentication.

9. The method of claim 7, wherein said step of determining images suitable for password construction includes steps of comparing histogram, latitude and longitude, and timestamps of the received images with the histogram, latitude and longitude, and timestamps of the images stored in the data storage repository.

10. The method of claim 7, wherein said step of Identifying a plurality of objects present within the images includes step of selecting techniques from a group consisting of face detection, image segmentation, pattern matching and any combinations thereof.

11. The method of claim 7, wherein said step of determining images suitable for password construction includes step of calculating maximum colour variation.

12. The method of claim 8, wherein said method comprises step of pseudo-randomly presenting images to the user and shuffling the displayed images after pre-determined time duration.

13. A non-transitory computer readable medium comprising program codes executable by at least one processor for image based location specific password construction and authentication; the program codes comprising:

a program code for storing a pre-determined set of rules and providing system processing commands based on said rules;

a program code for storing captured images, geographical locations and timestamps when the images were captured for password construction and authentication in a data storage repository and also username and demographic information of users who capture images;

a program code for displaying at least one image for password construction and authentication;

a program code for providing under influence of the system processing commands, image based password construction, said program code of providing image based password construction comprises the following:

a program code for accepting demographic information and a valid username of a user and storing user information and username;

a program code for generating a graph for guiding users to capture images for password construction, said program code of graph generation comprises the following:

a program code for identifying geographical locations of users and the time at which the geographical locations are identified;

a program code for identifying latitude and longitude of identified geographical locations;

a program code for creating grid boundaries for a pre-determined area around users geographical location based on the users' geographical locations and the latitude and longitude details;

a program code for identifying a plurality of geographical locations suitable for capturing images within a grid boundary;

a program code for checking the stored captured images relevant to identified geographical locations and determining geographical locations suitable for capturing images within said grid boundary; and a program code for plotting a map including directions to geographical locations associated with the latitude and longitude information where the images need to be captured for password construction, and displaying said map;

a program code for processing under influence of the system processing commands, images captured by the user, said program code of processing images captured by the user comprising the following:

a program code for accepting images captured by users based on the displayed map, said images including a plurality of objects and associated with latitude and longitude of locations of capture and timestamps for the times of capture;

a program code for comparing received images with stored images and determining unique captured images usable for password construction;

a program code for identifying a plurality of objects present within the images, and also enabling users to identify and select a plurality of objects within the images; and a program code for allotting an unique identifier to each of the objects within said images and also allotting unique numbers to said images to associate said images to the user and storing said images having unique numbers and containing objects having unique identifiers;

a program code for constructing under influence of the system processing commands, a password using the images associated with unique numbers and containing objects having unique identifiers, said program code of password construction comprising the following:

a program code for analysing the processed images and determining images suitable for password construction;

a program code for accepting from the user a selection of objects within the images in a user determined sequence;

a program code for crawling through the data storage repository and extracting unique identifiers corresponding to the objects selected by the user;

a program code for calculating a hash value for each of the suitable images based on the received unique identifiers of said selected objects, and storing the hash values in the data storage repository corresponding to each of the suitable images; and a program code for providing image based authentication under influence of the system processing commands wherein said image is used only once for providing one-time image based authentication.

* * * * *